(12) United States Patent
Metz et al.

(10) Patent No.: US 6,488,000 B2
(45) Date of Patent: Dec. 3, 2002

(54) CYLINDER BLOCK FOR AN INTERNAL COMBUSTION ENGINE

(75) Inventors: Hans Walter Metz, Pulheim (DE); Dietmar Ulrich Laufenberg, Windeck (DE)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/039,609

(22) Filed: Nov. 7, 2001

(65) Prior Publication Data

US 2002/0096138 A1 Jul. 25, 2002

(30) Foreign Application Priority Data

Nov. 7, 2000 (EP) ............................................. 00124090

(51) Int. Cl.$^7$ .................................................. F02F 1/00
(52) U.S. Cl. .................................................. 123/193.2
(58) Field of Search ....................................... 123/193.2

(56) References Cited

U.S. PATENT DOCUMENTS 5,404,846 A * 4/1995 Vanrens .................... 123/193.2
5,806,481 A * 9/1998 Ikegaya .................... 123/193.2

* cited by examiner

*Primary Examiner*—Marguerite McMahon
(74) *Attorney, Agent, or Firm*—Carlos L. Hanze

(57) ABSTRACT

For introduction of the pistons with piston rings, bevels have to be arranged on the cylinder bore. These bevels are usually arranged on the cylinder top surface and are used to position a compressor. As a result, dead spaces which occupy a relatively large volume are formed in the region of the combustion chamber, in which dead spaces only inadequate combustion takes place, which may have an adverse effect on the raw emissions. According to the invention, there is provision for a run-up cone, which is used for introduction the piston and compression of the piston rings, to be fitted at the crankshaft-side end of the cylinder bore.

17 Claims, 3 Drawing Sheets

CYLINDER BLOCK FOR AN INTERNAL COMBUSTION ENGINE

BACKGROUND OF THE INVENTION

1. Field of the Invention

The invention relates to a cylinder block for an internal-combustion engine, having bevels arranged at the cylinder bores for insertion of the cylinders.

2. Background Information

Since, in the uncompressed state, the piston rings have a larger diameter than the cylinder bore, the rings have to be compressed during the installation of the piston and have to be introduced axially into the cylinder in the compressed state. To ensure that the bearing surface of the cylinder bore and the piston rings are damaged as little as possible, compressors are fitted onto the top side (facing the cylinder head) of the cylinder block and are centered by means of a bevel arranged on the cylinder bore.

DE 39 20 845-C1 discloses a mounting tool for inserting pistons that are provided with piston rings into a cylinder. The tool is fitted onto the bevel of the cylinder bore. Making the bevel on the upper side of the cylinder is highly disadvantageous, since the bevel itself and the cavity which surrounds it between cylinder wall/piston ring/piston, on the one hand, and the gasket and cylinder head, on the other hand, represents a dead space in terms of flow, and the combustion in these areas only takes place incompletely. This leads to increased emissions of hydrocarbons.

SUMMARY OF THE INVENTION

According to the invention, it is provided that part of the crankshaft-side end of the cylinder bore is designed as a run-up cone (31) as shown in FIG. 3.

This inventive measure provides numerous advantages. Firstly, the bevel on the upper side of the cylinder block can be dispensed, or at most the cylinder edge may be slightly tapered. Consequently, the gasket can be placed closer to the cylinder bore wall, and accordingly the diameter of the combustion chamber in the cylinder head at this location can be brought closer to the cylinder bore wall. This reduces the dead space volume and considerably improves the raw emissions from the engine. Since the gasket between the cylinder bores must have a certain minimum web width, so that the sealing function is adequately ensured, and the gasket can now be positioned closer to the cylinder bore wall, overall the cylinders can be brought closer together. This allows the overall length of the engine to be reduced.

Moreover, there are manufacturing technology advantages. The bevel, which was previously arranged on the upper side of the cylinder block, always represented a stepped transition with respect to the installation tool. The piston rings were often damaged at this transition, and this damage is now avoided. Moreover, installation is simplified considerably. There is no need to fit and align the installation tool for each individual piston. Furthermore, unlike with a compressor, the piston rings are uniformly compressed over their circumference as a result of the introduction over the run-up cone. This also avoids damage to the piston rings. Finally, the engine is easier to repair, since pistons and piston rings can be fitted securely, if appropriate even after machining of the cylinder bearing surface.

The run-up cone may in particular have not just one included angle ($\delta$) over its height h, but rather a plurality of such angles. In particular, the run-up cone may, from its lower crankshaft-side end toward the cylinder bearing surface, have a curved profile. In this case, a preferred form may include the cone having, at its lower end, a cylindrical attachment, with the result that the included angle of the run-up cone over the height increases from a value of close to zero to a maximum value (turning point) and then decreases back to close to zero toward the cylinder bearing surface. In this way, the risk of damage to the piston rings can be reduced still further.

Preferably, the height of the run-up cone in the axial direction of the cylinder bore is at least equal to the maximum distance of the uppermost piston ring from the piston top surface (measured at the outer circumference of the latter if the top surface is not planar).

Since the opening of the run-up cone at its lower end (B1) is greater than the maximum diameter of all the piston rings—even if the piston rings are offset in the radial direction with respect to one another and/or with respect to the piston axis—the piston can be mounted reliably. The set minimum height ensures that the piston itself is initially guided in the run-up cone before the first piston ring enters the area of the lower opening of the run-up cone. This prevents the upper piston ring from jamming against the lower edge of the run-up cone.

It is also preferable for the maximum value of the included angle ($\delta$) of the run-up cone not to exceed 45°. Setting the included angle of the run-up cone further improves the ease of installation of the pistons.

Further advantages, objects and features of the invention will become apparent from the following detailed description of the invention taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numerals indicate like features and wherein.

DETAILED DESCRIPTION OF THE PREFERRED EMBODIMENTS

Figure 1:
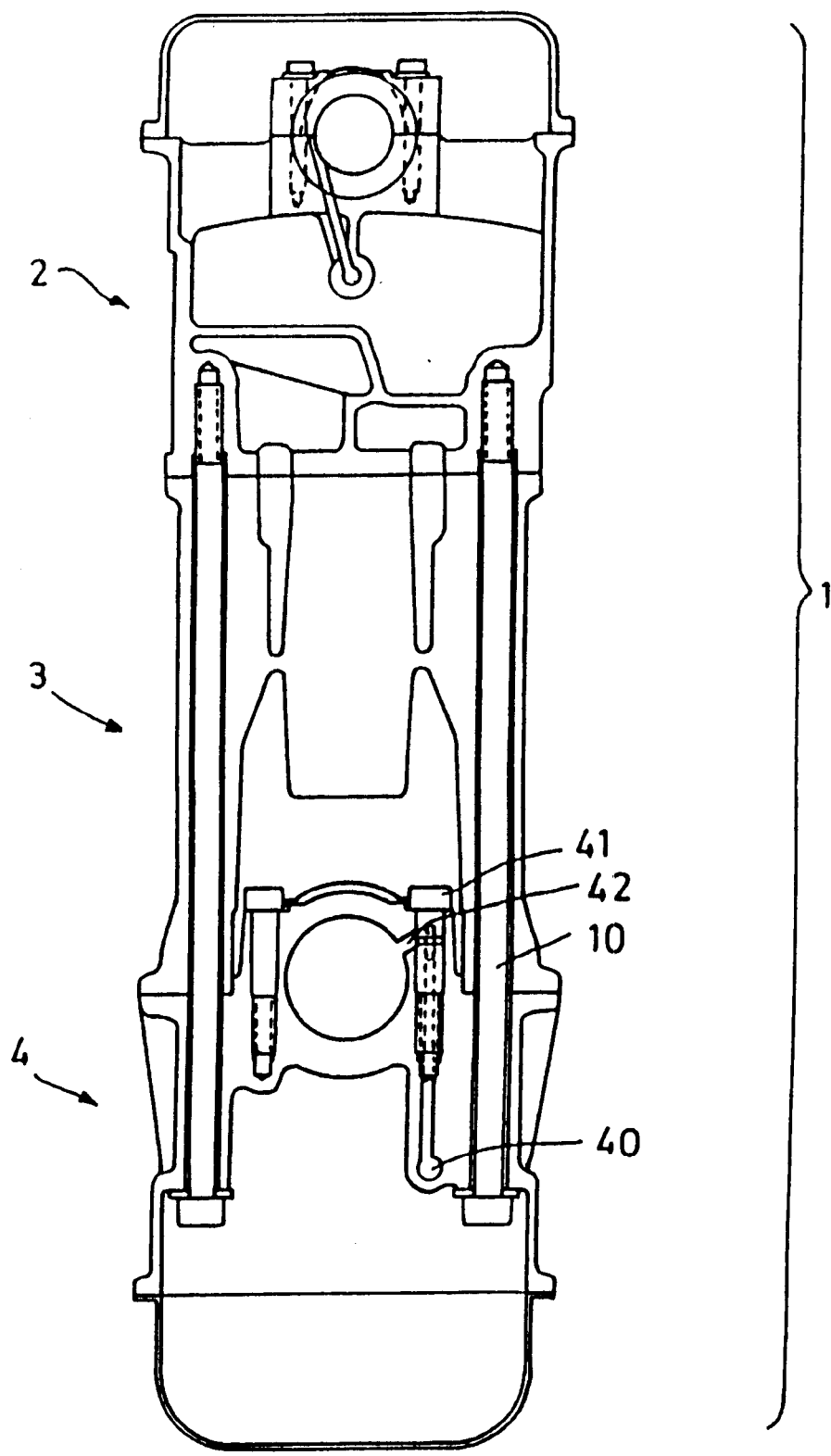
FIG. 1 shows a diagrammatic overview of the basic structure of an internal-combustion engine in which the invention is used.

The internal-combustion engine 1 is composed of the cylinder head 2, the engine block 3 and a basic frame 4. These components are connected to one another by bolts 10, which are screwed into the cylinder head from below. As a result of this assembly work, the engine block 3 is subject only to compressive forces. The crankshaft-bearing caps 41 are screwed onto the basic frame from the top by means of bolts. Preferably, in each case one of the securing bolts of the crankshaft-bearing cap is designed as a hollow bolt and is connected to the oil gallery 40. In this way, the supply of oil to the crankshaft bearing can be effected in a particularly advantageous way via a bore 42.

Figure 2A:
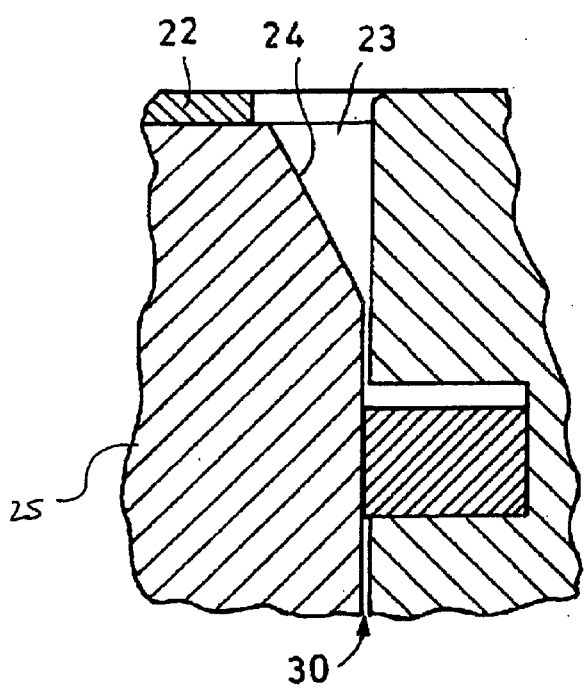
FIG. 2 is a sectional view of a prior art cylinder block and corresponding piston.
Figure 2B:
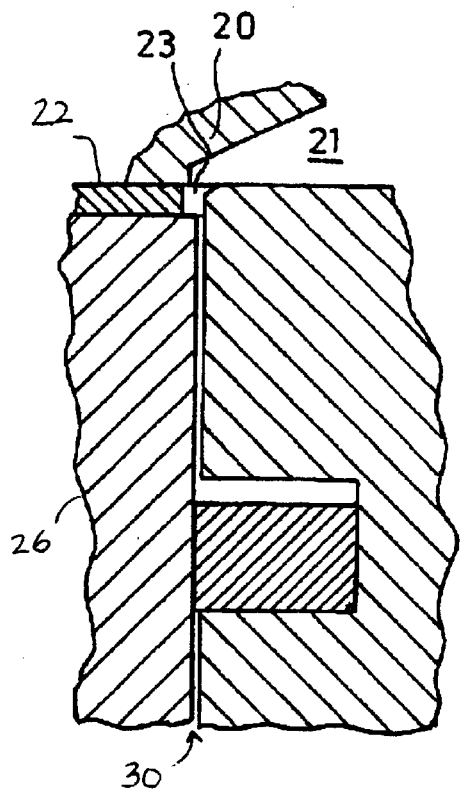

FIGS. 2A and 2B show a comparison of the design according to the prior art (2A) and the design according to the invention (2B).

In the design according to the prior art, the dead volume 23, on account of the bevel 24 arranged on the cylinder bore 30, is considerably greater than in the design according to the invention. The dead volume 23 is increased still further by the fact that the gasket 22 can also only reach as far as the external diameter of the bevel. Finally, the diameter of the combustion chamber 21 in the cylinder head 20 is also to be adapted according to the gasket diameter. This leads to a relatively large dead volume being formed.

FIGS. 2A and 2B show only the part of the dead volume that extends as far as the surface of the gasket for the lateral surface of the piston. In actual fact, the dead volume may also extend into the area of the combustion chamber.

By contrast, in the embodiment according to the invention, there is no need to make a bevel on the top surface of the cylinder block 26. Consequently the seal can be arranged significantly closer to the cylinder bore surface 30. Accordingly, the combustion chamber can also run closer to the center axis of the cylinder bore. This considerably reduces the dead volume 23.

Figure 3:
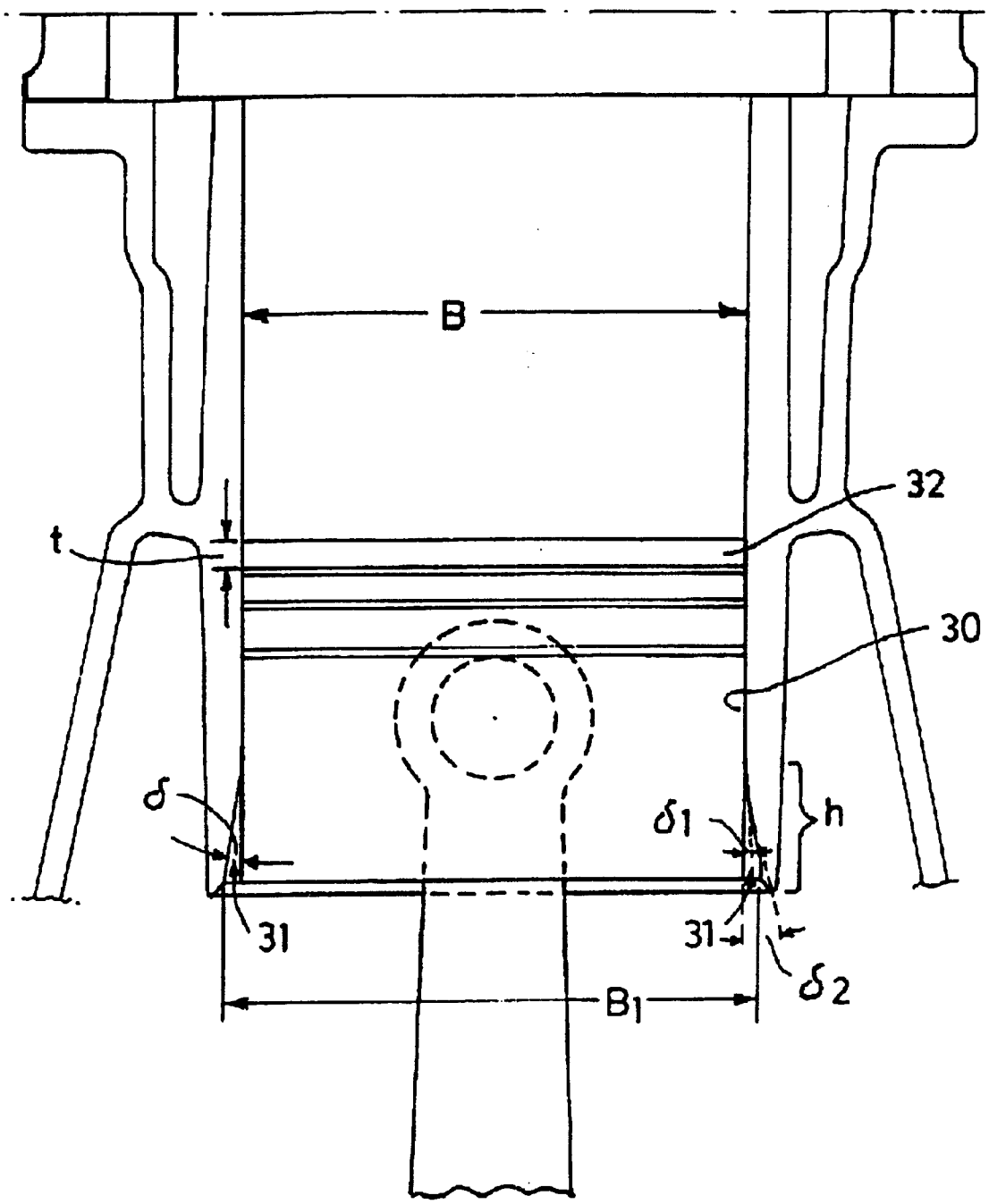
FIG. 3 is a sectional view of a cylinder block and corresponding piston in accordance with the present invention.

FIG. 3 shows the piston 32 in the cylinder bore 30 and the run-up cone 31. The run-up cone 31 is designed as part of the cylinder wall. In the region of the run-up cone, the diameter B1 is greater than the cylinder bore diameter B. The height h of the run-up cone 31 is in particular higher than the distance t of the upper piston ring from the top edge of the piston. In a predominant section, the included angle of the run-up cone is preferably less than 30°. In particular, as is also illustrated in the drawing, different included angles may follow one another over the height of the run-up cone.

A significant advantage of the design according to the invention is that, in an in-line engine, all the pistons can be introduced, in a pre-assembled unit together with the crankshaft, into the cylinder block. In this case, the introduction into the run-up cones can be effected, for example, using a tool which engages on the piston top surface and at the same time is guided in the cylinder bore.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. A cylinder block for a internal combustion engine, comprising:

cylinder bores formed in the cylinder block for housing corresponding pistons of the internal combustion engine, each of the pistons having one or more piston rings;

a crankshaft bore for housing a crankshaft of the internal combustion engine formed in proximity to said cylinder bores; and bevels formed in the cylinder block on sides of the cylinder bores closest to the crankshaft bore, said bevels being constructed and arranged to allow introduction of the pistons and compression of the piston rings within said cylinder bores.

2. The cylinder block according to claim 1, wherein said bevels comprise a run-up cone formed on the cylinder block.

3. The cylinder block according to claim 2, wherein one or more of the pistons comprises an uppermost piston ring disposed closest to a piston top surface, and wherein said run-up cone comprises a height (h) in an axial direction of a corresponding one of said cylinder bores, said height being at least equal to a maximum distance (t) of said uppermost piston ring to said piston top surface.

4. The cylinder block according to claim 2, wherein said run-up cone comprises at least one included angle (δ).

5. The cylinder block according to claim 2, wherein said at least one included angle is less than 45°.

6. A cylinder assembly formed in a cylinder block of an internal combustion engine, the cylinder assembly comprising:

a cylinder bore formed in the cylinder block for housing a reciprocating piston coupled to a crankshaft of the internal combustion engine, the piston having one or more piston rings radially disposed on an outer surface thereof, said cylinder bore having a side closest to the crankshaft of the internal combustion engine; and a bevel formed in the cylinder block along the crankshaft side of the cylinder bore for allowing introduction of the pistons and compression of the piston rings into the cylinder bore while minimizing dead space volume within the cylinder assembly.

7. The cylinder assembly according to claim 6, wherein said bevel comprises a run-up cone formed on the cylinder block.

8. The cylinder assembly according to claim 7, wherein the piston comprises an uppermost piston ring disposed closest to a top surface of the piston, and wherein said run-up cone comprises a height (h) in an axial direction of the cylinder bore, said height being at least equal to a maximum distance (t) of said uppermost piston ring to said piston top surface.

9. The cylinder assembly according to claim 7, wherein said run-up cone comprises at least one included angle (δ).

10. The cylinder assembly according to claim 7, wherein said at least one included angle is less than 45°.

11. The cylinder assembly according to claim 6, further comprising:

a cylinder head in communication with said cylinder bore; and a gasket disposed on the engine block and in communication with both said cylinder head and said cylinder bore so as to minimize the dead space volume within the cylinder assembly.

12. A method for installing a piston assembly into a cylinder block of an internal combustion engine, the piston assembly having a piston and one or more piston rings radially disposed on an outer surface thereof, the method comprising:

forming a cylinder bore in the cylinder block;

forming a bevel in the cylinder block on a side of the cylinder bore closest to a crankshaft of the internal combustion engine; and introducing the piston assembly into the cylinder bore from the side having the bevels to facilitate compression of the piston rings and installation of the piston assembly.

13. The method according to claim 12, wherein said bevel comprises a run-up cone formed on the cylinder block.

14. The method according to claim 13, wherein the piston comprises an uppermost piston ring disposed closest to a top surface of the piston, and wherein said run-up cone comprises a height (h) in an axial direction of the cylinder bore, said height being at least equal to a maximum distance (t) of said uppermost piston ring to said piston top surface.

15. The method according to claim 13, wherein said run-up cone comprises at least one included angle (δ).

16. The method according to claim 13, wherein said at least one included angle is less than 45°.

17. The method according to claim 12, further comprising the step of engaging a top surface of the piston in order to guide the piston assembly into the cylinder bore.

* * * * *